United States Patent
Ho et al.

(10) Patent No.: US 6,427,969 B1
(45) Date of Patent: Aug. 6, 2002

(54) ADJUSTABLE GATE VALVE ASSEMBLY FOR VACUUM CHAMBER

(75) Inventors: Sung-Peng Ho, Tainen Hsien; Meng-Ju Chou, Hsinchu; Chao-Ming Su, Taipei, all of (TW)

(73) Assignee: Helix Technology Inc. (TW)

( * ) Notice: Subject to any disclaimer, the term of this patent is extended or adjusted under 35 U.S.C. 154(b) by 0 days.

(21) Appl. No.: 09/843,677

(22) Filed: Apr. 27, 2001

(51) Int. Cl.[7] ............................................. F16K 25/00
(52) U.S. Cl. ........................ 251/85; 251/299; 137/613
(58) Field of Search .................................. 251/298, 299, 251/301, 84, 85, 87; 137/613

(56) References Cited

U.S. PATENT DOCUMENTS

| | | | | |
|---|---|---|---|---|
| 2,710,163 A | * | 6/1955 | Mueller et al. ................. | 251/85 |
| 4,033,549 A | * | 7/1977 | Stamer ......................... | 251/86 |
| 4,331,316 A | * | 5/1982 | Jandrasi ........................ | 251/86 |
| 5,205,532 A | * | 4/1993 | Naehring ....................... | 251/85 |
| 5,303,897 A | * | 4/1994 | Tengesdal et al. ........... | 251/298 |
| 5,305,985 A | * | 4/1994 | Fendley et al. ................ | 251/85 |
| 5,374,028 A | * | 12/1994 | Neubold ....................... | 251/298 |

* cited by examiner

Primary Examiner—Henry C. Yuen
Assistant Examiner—John Bastianelli
(74) Attorney, Agent, or Firm—Timothy J. Keefer; Wildman, Harrold, Allen & Dixon

(57) ABSTRACT

A vacuum processing device has at least one vacuum processing unit, which includes a housing defining a vacuum chamber, and a gate valve assembly. The valve assembly includes a lid plate. for covering an opening in the housing, and a connecting member connected fixedly to a rotating shaft. Each of several aligned adjustment rods connects the plate to the connecting member, and is disposed perpendicular to the plate. A plurality of resilientunits biases the plate away from the connecting member to press against a wall of the housing, which defines the opening. A plurality of adjusting units are movable respectively on the rods to vary the distance between a portion of the plate and a portion of the connecting member, which are interconnected by the respective one of the rods, so that the plate can be pressed entirely against the wall of the housing.

15 Claims, 8 Drawing Sheets

ADJUSTABLE GATE VALVE ASSEMBLY FOR VACUUM CHAMBER

BACKGROUND OF THE INVENTION

1. Field of the Invention

This invention relates to a vacuum chamber, more particularly to an adjustable gate valve assembly for a vacuum chamber, which includes an angle-adjustable lid plate and which can achieve effectively an air-tight seal between the lid and a wall that defines an opening of the vacuum chamber.

2. Description of the Related Art

In some current high-technology industries, a large number of products have to be processed in a vacuum chamber of a vacuum processing device, which is sealed by means of a gate valve assembly. The gate valve assembly includes a lid plate, which presses against a wall defining the vacuum chamber and which covers an opening in the wall, through which the products can move. An annular sealing strip is clamped between the lid plate and the wall, and is disposed around the opening, thereby establishing an air-tight seal therebetween. Although the gate valve assembly can, seal the vacuum chamber, it suffers from certain drawbacks, as set forth below:

1. Difficulty in manufacturing and mounting of the lid plate:

To achieve a vacuum-tight seal between the lid plate and the wall, it is absolutely necessary to mount the same in parallel. As a result, there is a need for a relatively high precision during manufacture and assembly of the gate valve assembly and the wall.

2. Unable to maintain sealing of the vacuum chamber after long-term use:

Heating and cooling are performed frequently within the vacuum chamber, thereby resulting in deformation of the lid plate, which in turn affects adversely the sealing of the vacuum chamber.

3. Increase in manufacturing costs due to repeated processes:

In a case where the manufacturing process of a product has several machining steps to be performed respectively in different vacuum chambers, for example, in a process for forming a thin film on a liquid crystal display glass panel, which includes the steps of cleaning, first heating, first sputtering of metal, second heating, and second sputtering of metal, it is necessary for each of the machining steps to evacuate air from the chamber to form a vacuum before machining and to pressurize and unload after machining, thereby resultingin a time-consuming process.

SUMMARY OF THE INVENTION

An object of this invention is to provide a vacuum processing device, which is easy to manufacture and mount.

Another object of this invention is to provide a durable vacuum processing device, in which a vacuum chamber can be maintained effectively for a long amount of time.

Still another object of this invention is to provide a vacuum processing device, in which a product can be machined efficiently, thereby reducing the manufacturing costs of the product.

According to this invention, a vacuum processing device has at least one vacuum processing unit, which includes a housing defining a vacuum chamber, and a gate valve assembly. The valve assembly includes a rotating shaft, a lid plate for covering an opening in the housing so as to seal the vacuum chamber, and a connecting member connected fixedly to the rotating shaft. Each of several aligned adjustment rods connects the lid plate to the connecting member. The adjustment rods are disposed perpendicular to the lid plate. A plurality of resilient units are coupled to the adjustment rods, respectively, for biasing the lid plate away from the connecting member to press against a wall of the housing, which defines the opening. A plurality of adjusting units are disposed respectively and movably on the adjustment rods. Each of the adjusting units is movable on a respective one of the adjustment rods to vary the distance between a portion of the lid plate and a portion of the connecting member, which are, interconnected by the respective one of the adjustment rods, so as to adjust angle between the lid plate and the connecting member, thereby pressing the lid plate entirely against the wall of the housing. Because the lid plate can be adjusted so as to be parallel to the wall, there is no need for high precision during the manufacture and mounting thereof. Furthermore, the angle adjustment of the lid plate can maintain effectively the sealing of the vacuum chamber for a long amount of time.

In the preferred embodiment, a plurality of vertical partitions are fixed within a horizontal tubular member so as to divide the interior space of the tubular member into a plurality of consecutive vacuum chambers to thereby constitute a plurality of vacuum processing units. Each of the partitions has an opening sealed by a gate valve assembly, and is provided with a conduit therein, through which cooling water is forced to flow. As such, when the machining steps of the manufacturing process of a product are performed in sequence within the consecutive vacuum chambers, the product can move from one of the chambers to another through one of the openings. In this way, when all of the openings are unsealed, all of the chambers can be evacuated simultaneously to form a vacuum prior to machining the product, and it is only necessary to introduce air into the last one of the chambers for pressurization and unloading after the product has been machined.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
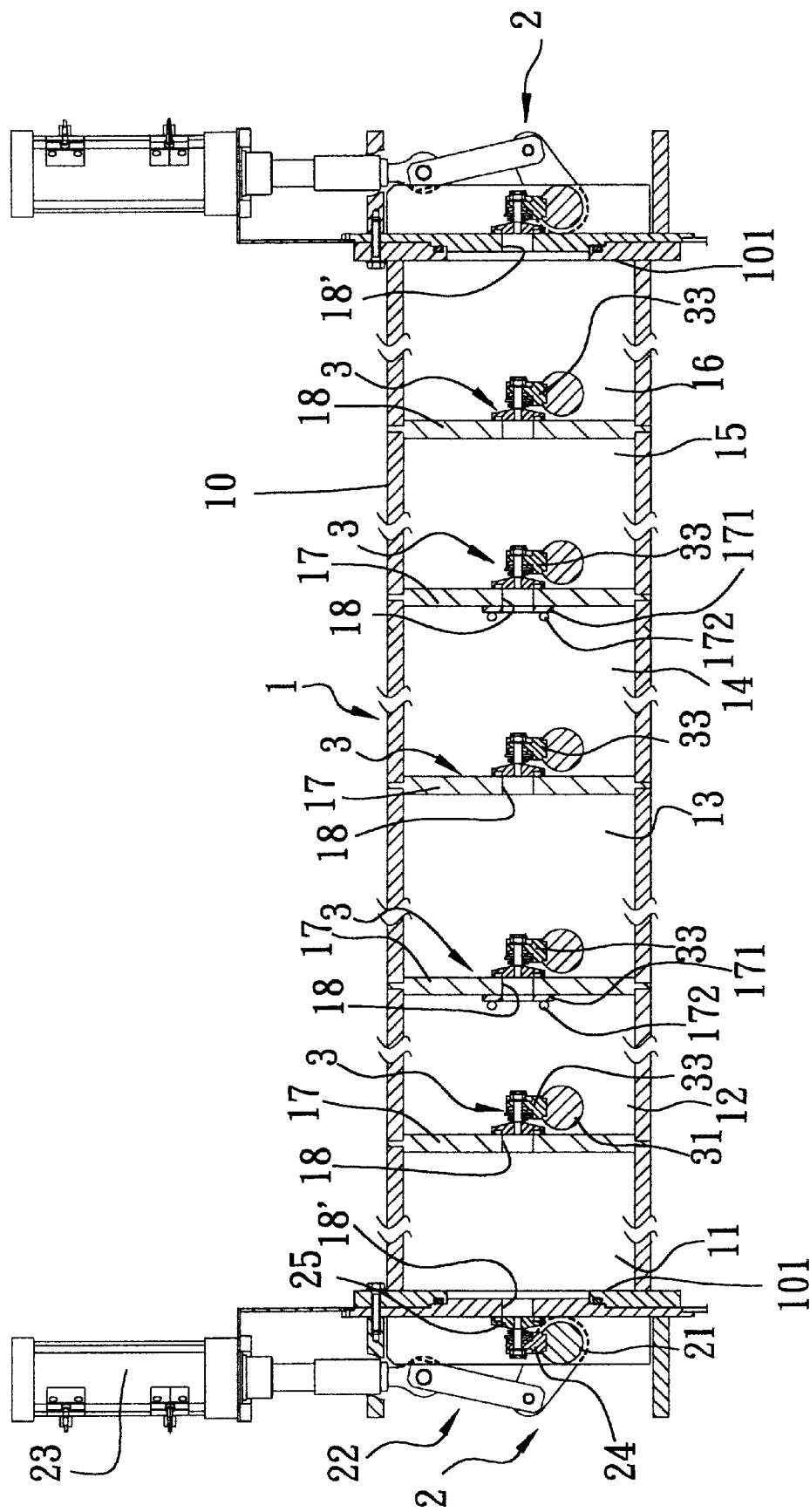
FIG. 1 is a schematic top view of the preferred embodiment of a vacuum processing device according to this invention.
Figure 2:
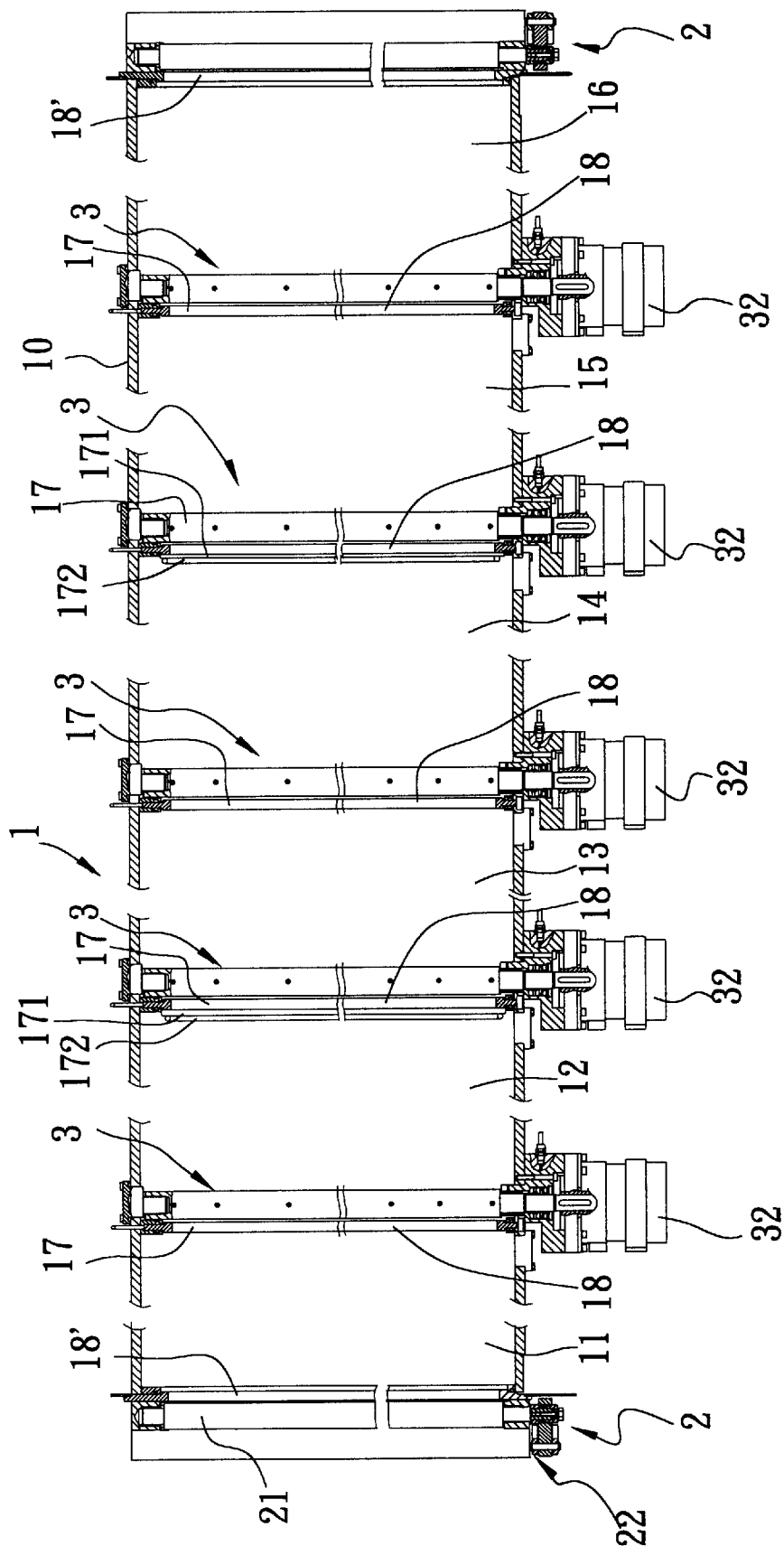
FIG. 2 is a schematic side view of the preferred embodiment.
Figure 3:
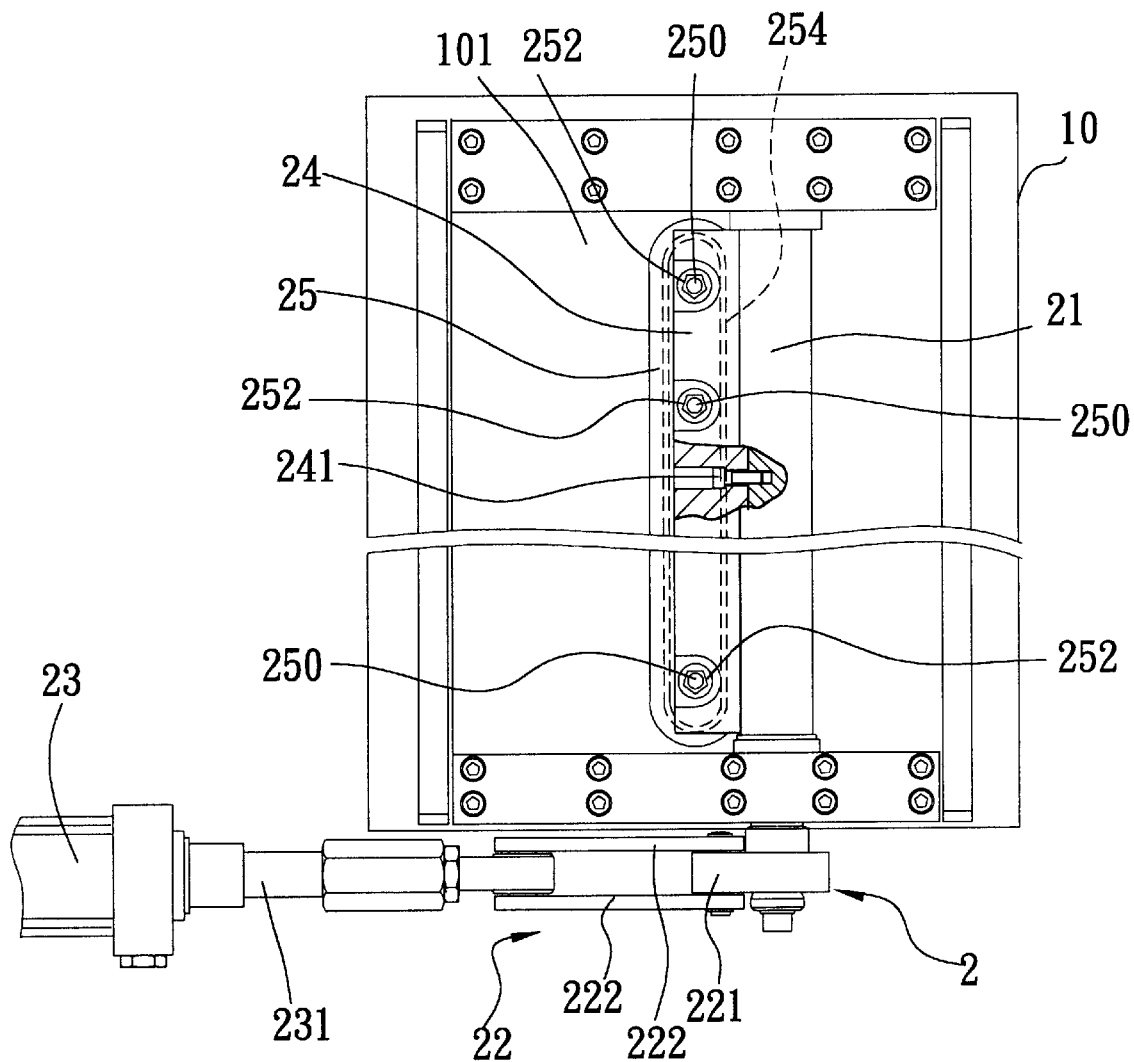
FIG. 3 is a partly sectioned front view of the preferred embodiment.

FIGS. 1, 2 and 3 are top, side, and front views of the preferred embodiment of a vacuum processing device according to this invention, which is shown to include a housing 1, a pair of front and rear exterior gate valve assemblies 2, and five interior gate valve assemblies 3. The device is used in a process for forming a thin film on a liquid crystal display panel, which includes six machine steps of cleaning, first heating, first sputtering of metal, second heating, second sputtering of metal, and pressurization and unloading.

The housing 1 includes a horizontal tubular member 10, two vertical end walls 101, and a plurality of vertical partitions 17 fixed within the tubular member 10, thereby defining a vacuum chamber 11, 12, 13, 14, 15, 16 between each adjacent pair of the partitions 17 and the end walls 101. Each of the partitions 17 and the end walls 101 is formed with an opening 18, 18' that is in fluid communication with the vacuum chambers 11, 12, 13, 14, 15, 16 and that permits movement of the product between an adjacent pair of the chambers 11, 12, 13, 14, 15, 16 therethrough.

The exterior and interior gate valve assemblies 2, 3 are associated with the vacuum chambers 11, 12, 13, 14, 15, 16, respectively, to constitute six vacuum processing units.

Figure 4:
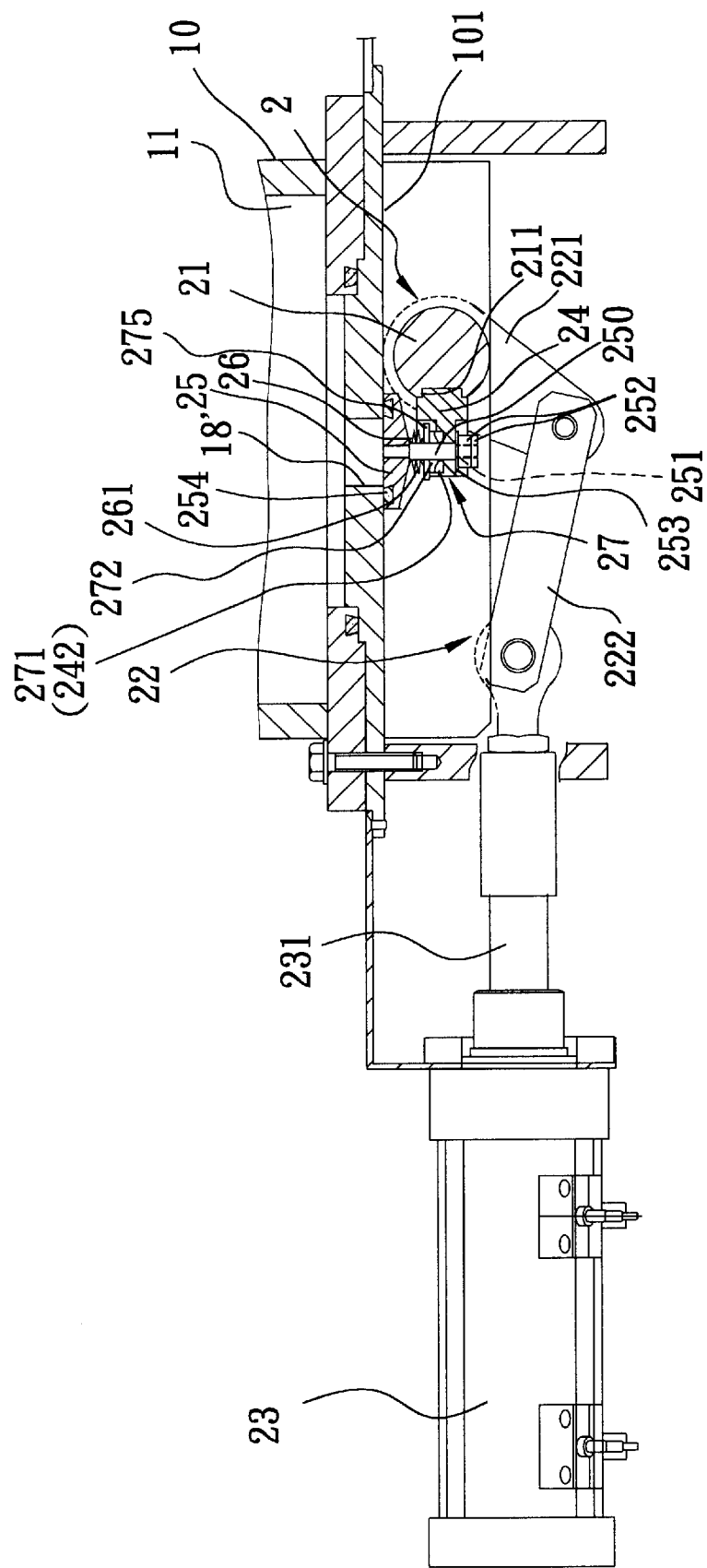
FIG. 4 is a sectional view of an exterior gate valve assembly of the preferred embodiment.

FIGS. 3 and 4 show the front exterior gate valve assembly 2, which is similar to the rear exterior gate valve assembly 2 in construction and which includes a rotating shaft 21, a connecting member 24, a lid plate 25, six aligned adjustment rods 250 (only three are shown in FIG. 3), six resilient units 26, and a universal joint unit 27. The rotating shaft 21 is disposed rotatably relative to the housing 10. The rotating shaft 21 is formed with an axially extending slot 211, which engages fittingly a portion of the connecting member 24, thereby preventing relative rotation therebeween. The connecting member 24 is connected fixedly to the rotating shaft 21 by means of a plurality of bolts 241 (only one is shown in FIG. 3), and is rotatable with the rotating shaft 21. The lid plate 25 covers the opening 18' so as to seal the vacuum chamber 11.

The adjustment rods 250 are disposed perpendicular to the lidplate 25. Each of the adjustment rods 250 connects the lid plate 25 to the connecting member 24. The resilient units 26 are coupled to the adjustment rods 250, respectively, for biasing the lid plate 25 away from the connecting member 24 to press against the end wall 101. Each of the adjustment rods 250 has a non-threaded end that is connected fixedly to a respective one of the lid plates 25, and an externally threaded end 251, which engages two adjusting units or adjustment nuts 252 and a washer 253. Each of the resilient units 26 includes two annular disc springs 261, which are sleeved on a respective one of the adjustment rods 250 between the lid plate 25 and the connecting member 24 so as to bias the connecting member 24, the washer 253, and the universal joint unit 27 to press against the adjustment nuts 252. As such, the adjustment nuts 252 can be moved on the adjustment rod 250 to vary the distance between a portion of the lid plate 25 and a portion of the connecting member 24, which are interconnected by the adjustment rod 250, so as to adjust angle between the lid plate 25 and the connecting member 24, thereby pressing the lid plate 25 entirely against the end wall 101. An O-ring 254 is disposed between the lid plate 25 and the end wall 101, thereby establishing an air-tight seal therebetween.

The front exterior gate valve assembly 2 further includes a driving unit, which consists of a linkage 22, and a hydraulic cylinder 23 with a piston rod 231. The piston rod 231 is movable in a radial direction of the rotating shaft 21. The linkage 22 interconnects the hydraulic cylinder 23 and the rotating shaft 21, thereby converting movement of the piston rod 231 into rotation of the rotating shaft 21. In this embodiment, the linkage 22 includes a rotary arm 221 sleeved fixedly on the rotating shaft 21, and two parallel links 222, each of which has two ends that are connected respectively and pivotally to the rotary arm 221 and the piston rod 231.

Figure 5:
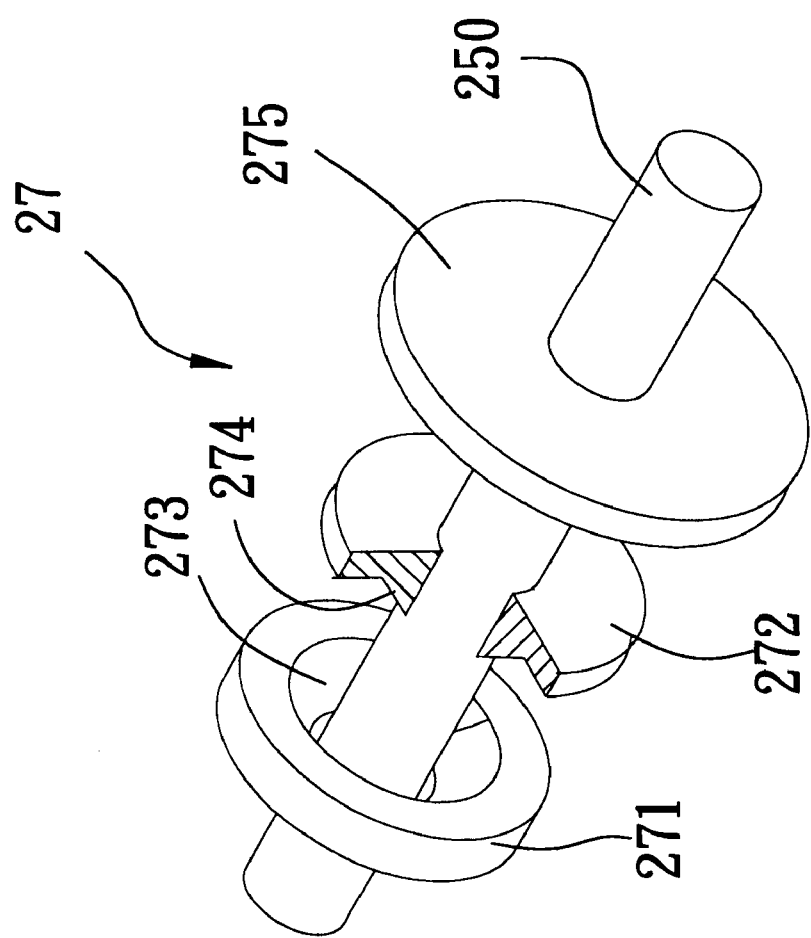
FIG. 5 is a schematic perspective view of a universal joint unit of the preferred embodiment.
Figure 6:
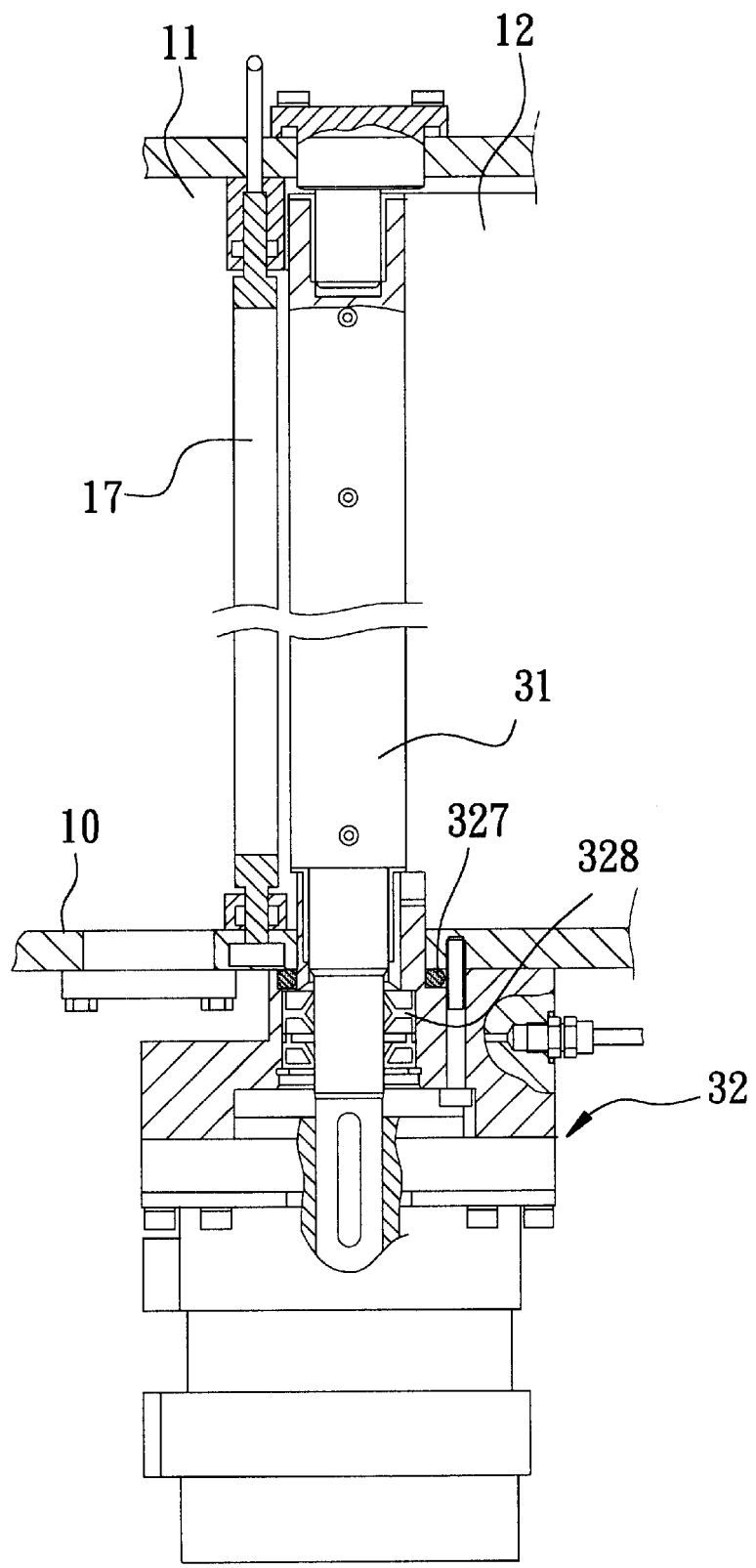
FIG. 6 is a schematic sectional view of an interior gate valve assembly of the preferred embodiment.
Figure 6A:
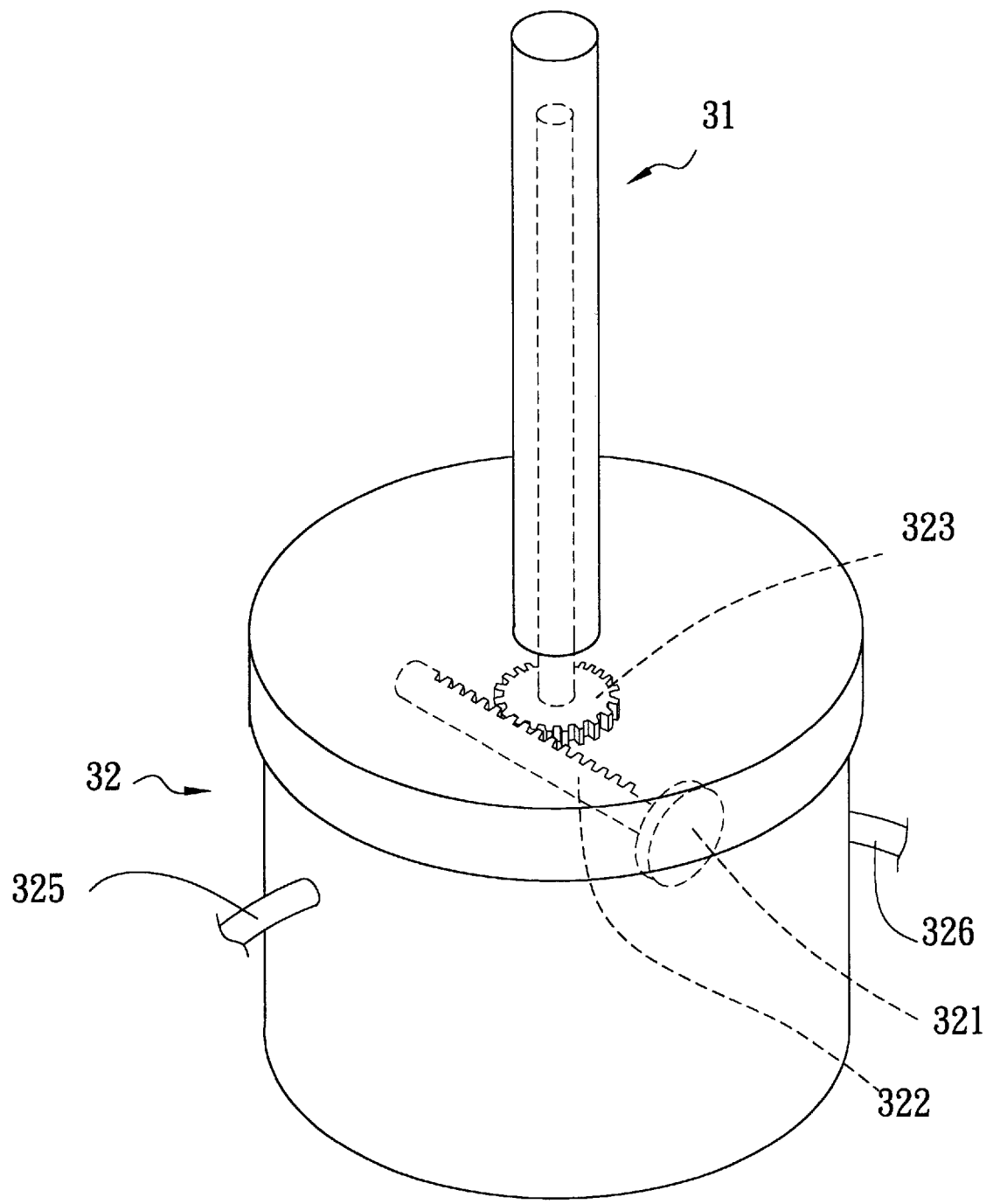
FIG. 6A is a schematic view, illustrating how an air cylinder is coupled to a rotating shaft of the preferred embodiment.

Referring to FIGS. 4 and 5, the connecting member 24 is formed with a cylindrical recess 242. The universal joint unit 27 is sleeved on the adjustment rod 250, and includes an annular socket member 271, an annular turning member 272, and a washer 275. The socket member 271 is received fittingly within the recess 242 in the connecting member 24, and is sleeved movably and rotatably on the adjustment rod 250. Because the socket member 272 has a central hole formed therethrogh, which has an enlarged generally semi-spherical end 273 and a minimum inner diameter that is larger than the diameter of the adjustment rod 250, it can rotate and move radially relative to the adjustment rod 250. The turning member 272 is sleeved axially and movably on the adjustment rod 250 in such a manner to prevent radial movement relative thereto, and has a projection 274, which is biased by the resilient unit 26 to abut against the socket member 271 and which is received fittingly within the generally semispherical end 273 of the central hole in the socket member 271.

Referring to FIGS. 1, 2, 6, and 6A, each of the interior gate valve assemblies 3 includes a rotating shaft 31, a connecting member 33, a driving unit, which consists of an air cylinder 32 with a piston 321, a rack 322, and a pinion 323. The rotating shaft 31 is connected to the partition 17 by means of the connecting member 33 in a manner, in which the rotating shaft 21 is connected to the end wall 101. The air cylinder 32 extends into the chamber 12, 13, 14, 15. The piston 321 is movable horizontally and reciprocally relative to the housing 10 by introducing compressed air into an inlet tube 325 and by discharging air from an outlet tube 326. The rack 322 is fixed to the piston 321. The pinion 323 is sleeved fixedly on the rotating shaft 21, and engages the rack 322 so as to convert horizontal reciprocal movement of the piston 321 into rotation of the rotating shaft 21. An o-ring 327 is disposed between the air cylinder 32 and the housing 10. An oil seal 328 is disposed between the rotating shaft 31 and the-air cylinder 32. Note that the hydraulic cylinder 23 (see FIG. 4) and the linkage 22 (see FIG. 4) of the exterior gate valve assembly 2 (see FIG. 4) can also be replaced with the driving unit of the interior gate valve assembly 3, which consists of the elements 32, 322, 323.

Figure 7:
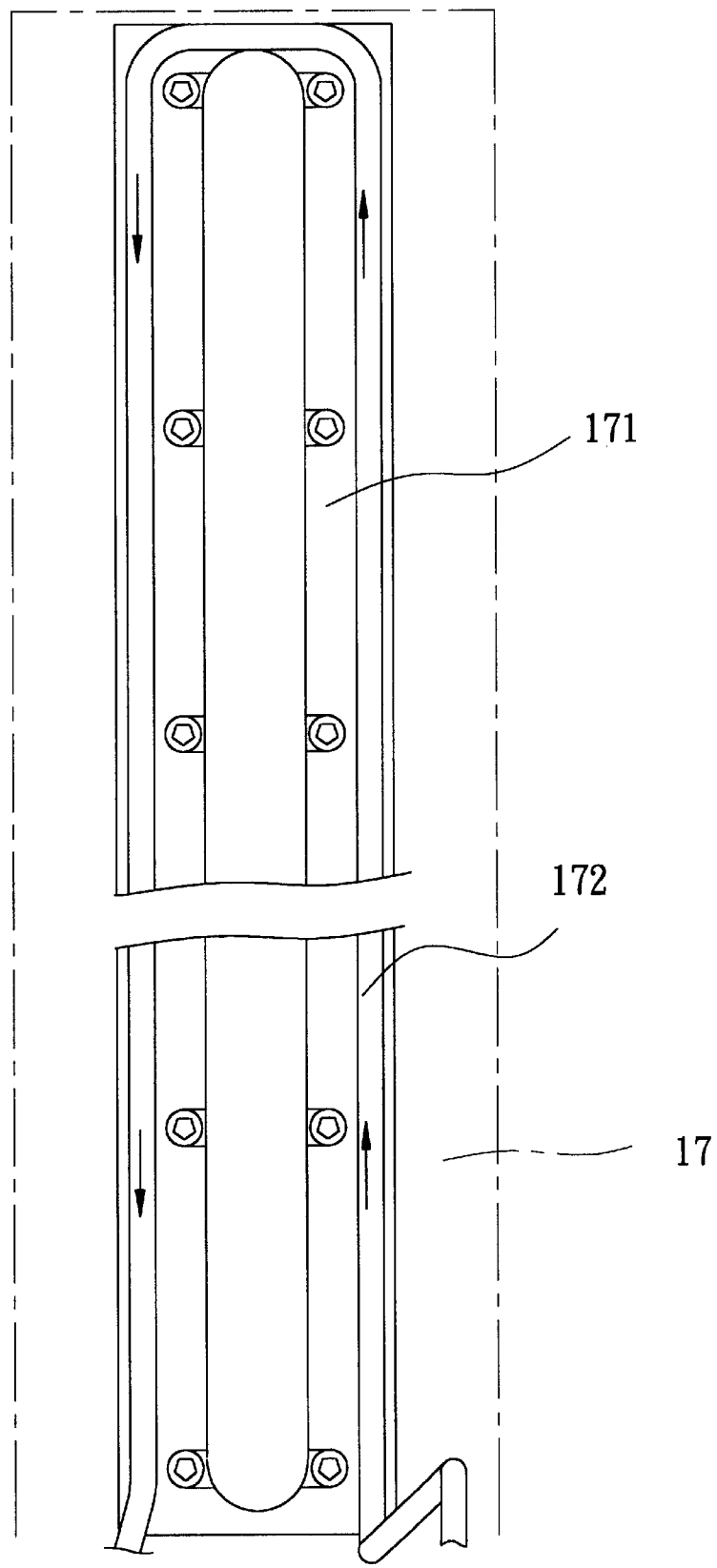
FIG. 7 is a schematic front view of a partition of the preferred embodiment.

Referring to FIG. 7, each of the partitions 17 is provided with a U-shaped conduit 172 therewithin, through which cooling water is forced to flow. The conduit 172 is fixed on the partition 17 by means of a mounting member 171, which is bolted to the partition 17. Accordingly, when cooling and heating are performed within the chambers 11, 12, 13, 14, 15, 16, the conduits 172 can minimize the deformation of the lid plates 25 (see FIGS. 1 and 4).

Referring to FIGS. 2, 3, and 4, because the lid plates 25 can be adjusted by operating the adjustment nuts 252 so as to be parallel to the partitions 17 and the end walls 101, there is no need for high precision during the manufacture and mounting thereof. Furthermore, the angle adjustment of the lid plates 25 can maintain effectively the sealing of the vacuum chambers 11, 12, 13, 14, 15, 16 for a long amount of time.

When the machining steps of the manufacturing process of a product are performed in sequence within the consecutive vacuum chambers 11, 12, 13, 14, 15, 16, the product can move from one of the chambers 11, 12, 13, 14, 15, 16 to another through one of the openings 18, 18'. In this way, when all of the openings 18, 18' are unsealed, all of the chambers 11, 12, 13, 14, 15, 16 can be evacuated simultaneously to form a vacuum prior to machining the product, and it is only necessary to introduce air into the chamber 16 for pressurization and unloading after the product has been machined.

With this invention thus explained, it is apparent that numerous modifications and variations can be made without departing the scope and spirit of this invention. It is therefore intended that this invention be limited only as indicated by the appended claims.

We claim:

1. A vacuum processing unit comprising:
   a housing defining a vacuum chamber therein and having an opening in fluid communication with said vacuum chamber; and
   a gate valve assembly including
      a rotating shaft disposed rotatably relative to said housing,
      a lid plate for covering said opening so as to seal said vacuum chamber,
      a connecting member connected fixedly to said rotating shaft and rotatable with said rotating shaft,
      a plurality of aligned adjustment rods disposed perpendicular to said lid plate, each of said adjustment rods connecting said lid plate to said connecting member,
      a plurality of resilient units coupled to said adjustment rods, respectively, for biasing said lid plate away from said connecting member to press against a wall of said housing, which defines said opening, and a plurality of adjusting units disposed respectively and movably on said adjustment rods, each of said adjusting units being movable on a respective one of said adjustment rods to vary the distance between a portion of said lid plate and a portion of said connecting member, which are interconnected by the respective one of said adjustment rods, so as to adjust the angle between said lid plate and said connecting member, thereby pressing said lid plate entirely against said wall of said housing,
      each of said adjustment rods having a non-threaded end that is connected fixedly to said lid plate, and an externally threaded end, each of said adjusting units being constructed as an adjustment nut, which engages said threaded end of the respective one of said adjustment rods, thereby clamping said connecting member between said adjustment nuts and said resilient units,
      each of said resilient units being constructed as an annular disc spring, which is sleeved on a respective one of said adjustment rods between said lid plate and said connecting member.

2. The vacuum processing unit as claimed in claim 1, wherein each of said connecting member is formed with a cylindrical recess, said gate valve assembly further including a plurality of universal joint units, each of which is disposed between said connecting member and a respective one of said adjustment rods, each of said universal joint units including:
   an annular socket member received fittingly within said recess in said connecting member and sleeved movably and rotatably on the respective one of said adjustment rods, said socket member having a central hole formed therethrough, which has an enlarged generally semispherical end and a minimum inner diameter that is larger than the diameter of the respective one of said adjustment rods so as to permit radial movement and rotation of said socket member relative to the respective one of said adjustment rods; and
   an annular turning member sleeved axially and movably on the respective one of said adjustment rods in such a manner to prevent radial movement relative thereto, said turning member having a projection, which is biased by a respective one of said resilient units to abut against said socket member and which is received fittingly within said generally semispherical end of said central hole in said socket member.

3. The vacuum processing unit as claimed in claim 2, wherein each of said universal joint units further includes a washer, which is disposed between a respective one of said turning members and a respective one of said resilient units.

4. The vacuum processing unit as claimed in claim 1, wherein said rotating shaft is formed with an axially extending slot, said connecting member having a portion, which is received fittingly within said slot in said rotating shaft and which is bolted to said rotating shaft.

5. The vacuum processing unit as claimed in claim 1, wherein said gate valve assembly further includes a driving unit, which has:
   a hydraulic cylinder with a piston rod, which is movable in a radial direction of said rotating shaft; and
   a linkage interconnecting said hydraulic cylinder and said rotating shaft, thereby converting movement of said piston rod into rotation of said rotating shaft.

6. The vacuum processing device as claimed in claim 1, wherein said gate valve assembly further includes a driving unit, which has:
   an air cylinder extending into said vacuum chamber and including a piston that is movable reciprocally relative to said housing in a direction that is perpendicular to said rotating shaft, said piston being provided with a fixed rack; and
   a pinion sleeved fixedly on said rotating shaft and engaging said rack so as to convert reciprocal movement of said piston into rotation of said rotating shaft.

7. A vacuum processing device comprising:
   a housing including a horizontal tubular member with two vertical end walls, and a plurality of vertical partitions fixed within said tubular member, thereby defining a vacuum chamber between each adjacent pair of said partitions and said end walls, each of said partitions and said end walls being formed with an opening in fluid communication with said vacuum chambers; and
   a plurality of gate valve assemblies associated with said vacuum chambers, respectively, to constitute a plurality of vacuum processing units, each of said gate valve assemblies including
      a rotating shaft disposed rotatably relative to said housing,
      a lid plate for covering a respective one of said openings so as to seal the respective one of said vacuum chambers,
      a connecting member connected fixedly to said rotating shaft and rotatable with said rotating shaft,
      a plurality of aligned adjustment rods disposed perpendicular to said lid plate, each of said adjustment rods connecting said lid plate to said connecting member,
      a plurality of resilient units coupled to said adjustment rods, respectively, for biasing said lid plate away from said connecting member to press against a respective one of said partitions and said end walls, and a plurality of adjusting units disposed respectively and movably on said adjustment rods, each of said adjusting units being movable on a respective one of said adjustment rods to vary the distance between a portion of said lid plate and a portion of said connecting member, which are interconnected by the respective one of said adjustment rods, so as to adjust the angle between said lid plate and said connecting member, thereby pressing said lid plates entirely against said partitions and said end walls.

8. The vacuum processing device as claimed in claim 7, wherein each of said adjustment rods has a non-threaded end that is connected fixedly to a respective one of said lid plates, and an externally threaded end, each of said adjusting units being constructed as an adjustment nut, which engages said threaded end of the respective one of said adjustment rods, thereby clamping said connecting members between said adjustment nuts and said resilient units.

9. The vacuum processing device as claimed in claim 7, wherein each of said resilient units is constructed as an annular disc spring, which is sleeved on a respective one of said adjustment rods between a respective one of said lid plates and a respective one of said connecting members.

10. The vacuum processing device as claimed in claim 7, wherein each of said gate valve assemblies. further includes a plurality of universal joint units, each of which is disposed between a respective one of said connecting members and a respective one of said adjustment rods, each of said universal joint units including:

a cylindrical recess formed in the respective one of said connecting members;

an annular socket member received fittingly within said recess in the respective one of said connecting members and sleeved movably and rotatably on the respective one of said adjustment rods, said socket member having a central hole formed therethrogh, which has an enlarged generally semispherical end and a minimum inner diameter that is larger than the diameter of the respective one of said adjustment rods so as to permit radial movement and rotation of said socket member relative to the respective one of said adjustment rods; and an annular turning member sleeved axially and movably on the respective one of said adjustment rods in such a manner to prevent radial movement relative thereto, said turning member having a projection, which is biased by a respective one of said resilient units to abut against said socket member and which is received fittingly within said generally semispherical end of said central hole in said socket member.

11. The vacuum processing device as claimed in claim 10, wherein each of said universal joint units further includes a washer, which is disposed between a respective one of said turning members and a respective one of said resilient units.

12. The vacuum processing device as claimed in claim 7, wherein each of said rotating shafts is formed with an axially extending slot, each of said connecting members having a portion, which is received fittingly within said slot in a respective one of said rotating shafts and which is bolted to the respective one of said rotating shafts.

13. The vacuum processing unit as claimed in claim 7, wherein each of two of said gate valve assemblies associated with said end walls further includes:

a hydraulic cylinder with a piston rod, which is movable in a radial direction of a respective one of said rotating shafts; and a linkage interconnecting said hydraulic cylinder and the respective one of said rotating shafts, thereby converting movement of said piston rod into rotation of the respective one of said rotating shafts.

14. The vacuum processing device as claimed in claim 7, wherein each of said gate valve assemblies further includes:

an air cylinder extending into a respective one of said vacuum chambers and including a piston that is movable horizontally and reciprocally relative to said housing, said piston being provided with a fixed rack; and a pinion sleeved fixedly on a respective one of said rotating shafts and engaging said rack so as to convert horizontal reciprocal movement of said pistons into rotation of said rotating shafts.

15. The vacuum processing device as claimed in claim 7, wherein each of said partitions is provided with a conduit therewithin, through which cooling water is forced to flow.

* * * * *